US008818781B2

(12) United States Patent
Le Ravalec et al.

(10) Patent No.: US 8,818,781 B2
(45) Date of Patent: Aug. 26, 2014

(54) METHOD FOR OPERATING AN OIL POOL BASED ON A RESERVOIR MODEL GRADUALLY DEFORMED BY MEANS OF COSIMULATIONS

(75) Inventors: Mickaële Le Ravalec, Rueil-Malmaison (FR); Sébastien Da Veiga, Paris (FR)

(73) Assignee: IFP Energies Nouvelles (FR)

( * ) Notice: Subject to any disclaimer, the term of this patent is extended or adjusted under 35 U.S.C. 154(b) by 506 days.

(21) Appl. No.: 13/166,030

(22) Filed: Jun. 22, 2011

(65) Prior Publication Data

US 2011/0308792 A1 Dec. 22, 2011

(30) Foreign Application Priority Data

Jun. 22, 2010 (FR) .................................... 10 02616

(51) Int. Cl.
  G06G 7/48 (2006.01)
  G01V 1/40 (2006.01)
  G01N 15/08 (2006.01)
  G01V 1/00 (2006.01)

(52) U.S. Cl.
  USPC .................... 703/10; 702/11; 702/12; 702/14

(58) Field of Classification Search
  USPC .................................................. 703/5, 9, 10
  See application file for complete search history.

(56) References Cited

U.S. PATENT DOCUMENTS

| 6,591,235 B1* | 7/2003 | Chen et al. ..................... 704/236 |
| 2006/0241920 A1 | 10/2006 | Le Ravalec-Dupin et al. |
| 2007/0055447 A1 | 3/2007 | Mickaele et al. |
| 2007/0156341 A1* | 7/2007 | Langlais et al. ................ 702/11 |
| 2008/0134760 A1* | 6/2008 | Egermann et al. ................ 73/38 |
| 2011/0246163 A1* | 10/2011 | Dale et al. ........................ 703/10 |
| 2011/0257901 A1* | 10/2011 | Bechhoefer ..................... 702/34 |

FOREIGN PATENT DOCUMENTS

| FR | 2 869 421 | 10/2005 |
| FR | 2 890 453 | 3/2007 |

OTHER PUBLICATIONS

Mickaele Le Ravalec, et al: 2000, The FFT Moving Average (FFT-MA) Generator: An Efficient Numerical Method for Generating and Conditioning Gaussian Simulations, Mathematical Geology, 32(6), pp. 701-723.*
Hu, Lin Y.: 2000, Gradual Deformation and Iterative Calibration of Gaussian-Related Stochastic Models, Mathematical Geology, vol. 32, No. 1, 2000, pp. 87-108.*
Fichtl, P., Fournier F., Royer J-J., 1997 Cosimulation of Lithofacies and Associated Reservoir Properties Using Well and Seismic Data. SPE, Annual Technical Conference and Exhibition fo the Society of Petroleum Engineers, 72nd, San Antonia, Oct. 5-8, 1997, Proceedings, Part I, pp. 381-393., SPE 38680.*
Mata-Lima, H., Reservoir characterization with iterative direct sequential co-simulation: Integrating fluid dynamic data into stochastic model, Journal of Petroleum Science and Engineering 62 (2008) 59-72.*
RamaRao, Band S. et al: 1995, "Pilot Point Methodology for Automated Calibration of an Ensemble of Conditionally Simulated Transmissivity Fields. 1. Theory and Computational Experiments", Water Resources Research, vol. 31, No. 3, pp. 475-493, Mar. 1995.
Gómez-Hernánez, J. Jaime, et al: 1997, Stochastic Simulation of Transmissivity Fields Conditional to Both Transmissivity and Piezometric Data, 1. Theory, Journal of Hydrology, 203, pp. 162-174.
Didier Yu Ding et al: "History Matching Geostatistical Model Realizations Using a Geometrical Domain Based Parameterizaton Technique", Mathematical Geosciences, Springer-Verlag, Berlin/Heidelberg, vol. 42, No. 4, Apr. 13, 2010, pp. 413-432, XP 019792936, ISSN: 1874-8953.
Hoffman et al: "Geostatistical History Matching Using a Regional Probability Perturbation Method", SPE Annual Technical Conference and Exhibition, XX, XX, No. 84409, Oct. 5, 2003, pp. 1-14, XP002288861, Global Probability Perturbation Techniques, p. 2.
Caers J: "Geostatistical History Matching Under Training Image Based Geological Model Constraints", SPE Proceedings, XX, XX, Sep. 29, 2002, pp. 1-16, XP002404105.
Goovaerts, P., 1997, Geostatistics for Natural Resources Evaluation, Oxford Press, New York, pp. 390-393.

\* cited by examiner

*Primary Examiner* — Kamini S Shah
*Assistant Examiner* — Scott S Cook
(74) *Attorney, Agent, or Firm* — Antonelli, Terry, Stout & Kraus, LLP.

(57) ABSTRACT

A method is disclosed for operating an oil pool based on a reservoir model gradually deformed by means of cosimulations. A map of a property of the pool is obtained by a stochastic simulation of a first random function. A correlation coefficient is chosen between the first random function and a second random function with an identical mean and covariance. The map is modified by a cosimulation of the two random functions by using the correlation coefficient. The correlation coefficient is modified and the cosimulation step is reiterated to deform the map and minimize a matching objective function. Finally, the pool is operated by implementing an operating scheme accounting for the deformed map.

8 Claims, 5 Drawing Sheets

METHOD FOR OPERATING AN OIL POOL BASED ON A RESERVOIR MODEL GRADUALLY DEFORMED BY MEANS OF COSIMULATIONS

BACKGROUND OF THE INVENTION

1. Field of the Invention

The present invention relates to the technical field of the oil industry, and more particularly the operation of subterranean reservoirs, such as oil reservoirs or gas storage sites.

2. Description of the Prior Art

Optimizing and operating oil pools rely on a description that is as accurate as possible of the structure, of the petrophysical properties, of the fluid properties, and so on, of the pool being studied. For this, the experts use a tool which makes it possible to reflect these aspects in an approximate manner known as the reservoir model. Such a model is a model of the subsoil, representative both of its structure and of its behavior. Generally, this type of model is represented on a computer, and it is then called a digital model. A reservoir model comprises a meshing or grid, usually three-dimensional, associated with one or more maps of petrophysical properties (porosity, permeability, saturation, etc.). The association process entails assigning values of these petrophysical properties to each of the meshes of the grid.

These models are well known and widely used in the oil industry, making it possible to determine numerous technical parameters relating to the study or operation of a reservoir, of hydrocarbons for example. In practice, since the reservoir model is representative of the structure of the reservoir and of its behavior, the engineer uses, for example to determine the areas that have the greatest chances of containing hydrocarbons, the areas in which it may be advantageous/necessary to drill an injection or production well to improve the recovery of the hydrocarbons, the type of tools to be used, the properties of the fluids used and recovered, and so on. These interpretations of reservoir models in terms of "operating technical parameters" are well known to the experts, despite the fact that new methods are regularly developed. Similarly, the modeling of $CO_2$ storage sites makes it possible to monitor these sites, to detect anomalous behaviors and to predict the displacement of the injected $CO_2$.

The purpose of a reservoir model is therefore to best reflect all the known information concerning a reservoir. A reservoir model is representative when a reservoir simulation provides estimates of historical data that are very close to the observed data. The term "historical data" is used to mean the production data obtained from measurements on the wells in response to the production of the reservoir (production of oil, production of water from one or more wells, gas/oil ratio (GOR), proportion of production water ("water cut"), and/or the repetitive seismic data (4D seismic impedances in one or more regions, etc.). A reservoir simulation is a technique that makes it possible to simulate the fluid flows within a reservoir by software called a flow simulator.

For this, the integration of all available data is essential. These data generally comprise:

Measurement at certain points of the geological formation, for example in wells. These data are called static because they are unchanging over time (in the reservoir production time scale) and are directly linked to the property of interest.

"Historical data" comprising production data, for example the fluid flow rates measured on the wells, the tracer concentrations and data obtained from seismic acquisition campaigns reiterated at successive intervals. These data are called dynamic because they change in the course of operation and are indirectly linked to the properties assigned to the meshes of the reservoir model.

The techniques for integrating dynamic data (production and/or 4D seismic) in a reservoir model are well known to the experts: these are so-called "history matching" techniques.

History matching modifies the parameters of a reservoir model, such as the permeabilities, the porosities or the skins of wells (representing damage around the well), the connections of faults, and so on, to minimize the deviations between the simulated and measured historical data. The parameters may be linked to geographic regions, such as the permeabilities or porosities around a well or several wells. The deviation between real data and simulated data forms a functional, called an objective function. The history matching problem is resolved by minimizing this functional.

Many techniques have been developed over recent years to modify the geological model in order to match the historical data while preserving the consistency of this model with respect to the static observations. The available static data are used to define the random functions for each petrophysical property such as the porosity or permeability. A representation of the spatial distribution of a petrophysical property is a realization of a random function. Generally, a realization is generated from, on the one hand, a mean, a variance and a covariance function which characterizes the spatial variability of the property being studied and, on the other hand, a term or series of random numbers. There are many simulation techniques such as the Gaussian sequential simulation method, the Cholesky method or even the FFT-MA method.

Goovaerts, P., 1997, Geostatistics for Natural Resources Evaluation, Oxford Press, New York, 483 p.

Le Ravalec, M., Ncetinger M., and Hu L.-Y., 2000, The FFT Moving Average (FFT-MA) Generator: An Efficient Numerical Method for Generating and Conditioning Gaussian Simulations, Mathematical Geology, 32(6), 701-723.

Perturbation techniques make it possible to modify a realization of a random function while ensuring the fact that the disturbed realization is also a realization of this same random function.

Among these perturbation techniques, there are the pilot points method developed by RamaRao et al. (1995) and Gomez-Hernandez et al. (1997), the gradual deformation method proposed by Hu (2000) and the probability perturbation method introduced by Caers (2003). These methods can be used to modify the spatial distribution of heterogeneities:

RamaRao, B. S., Lavenue, A. M., Marsilly, G. de, Marietta, M. G., 1995, Pilot Point Methodology for Automated Calibration of An Ensemble of Conditionally Simulated Transmissivity Fields. 1. Theory and Computational Experiments. WRR, 31(3), 475-493.

Gomez-Hernandez, J., Sahuquillo, A., and Capilla, J. E., 1997, Stochastic Simulation of Transmissivity Fields Conditional to Both Transmissivity and Piezometric Data, 1. Theory, J. of Hydrology, 203, 162-174.

Hu, L-Y., 2000, Gradual Deformation and Iterative Calibration of Gaussian-related Stochastic Models, Math. Geol., 32(1), 87-108.

Caers, J., 2003, Geostatistical History Matching Under Training-Image Based Geological Constraints. SPE J. 8(3), 218-226.

SUMMARY OF THE INVENTION

In particular the invention makes it possible to modify a representation of the reservoir, called a reservoir model, to make the representation consistent with the various data collected in the field.

Thus, the invention relates to an alternative method for operating or controlling an oil pool or reservoir from a reservoir model. This alternative method relies on a history matching in which the reservoir model is gradually deformed by cosimulations which depend on correlation coefficients which then become parameters for adjusting the history matching process.

The invention relates to a method for operating an oil pool according to a given operating scheme defined on the basis of a representation of the pool, the representation comprising a meshing associated with at least one map of a property of the pool obtained by a stochastic simulation of a first random function, Simulated Transmissivity Fields. 1. Theory and Computational Experiments. WRR, 31(3), 475-493.

Gomez-Hernandez, J., Sahuquillo, A., and Capilla, J. E., 1997, Stochastic Simulation of Transmissivity Fields Conditional to Both Transmissivity and Piezometric Data, 1. Theory, J. of Hydrology, 203, 162-174.

Hu, L-Y., 2000, Gradual Deformation and Iterative Calibration of Gaussian-related Stochastic Models, Math. Geol., 32(1), 87-108.

Caers, J., 2003, Geostatistical History Matching Under Training-Image Based Geological Constraints. SPE J. 8(3), 218-226.

SUMMARY OF THE INVENTION

In particular the invention makes it possible to modify a representation of the reservoir, called reservoir model, to make it consistent with the various data collected in the field.

Thus, the invention relates to an alternative method for operating an oil pool from a reservoir model. This alternative method relies on a history matching in which the reservoir model is gradually deformed by cosimulations which depend on correlation coefficients which then become parameters for adjusting the history matching process.

The invention relates to a method for operating an oil pool according to a given operating scheme defined on the basis of a representation of the pool, the representation comprising a meshing associated with at least one map of a property of the pool obtained by a stochastic simulation of a first random function, in which dynamic data are acquired during operation of the pool, and the map being modified to minimize an objective function measuring a difference between the dynamic data and dynamic data simulated by the representation of the pool and a flow simulator. The method comprises the following steps:

i. at least one correlation coefficient between the first random function and at least one second random function with the same mean and the same covariance are chosen;
ii. the map is modified by performing a cosimulation of the first random function and of at least the second random function by using the correlation coefficient;
iii. the correlation coefficient is modified and step ii) is reiterated until the objective function converges toward a minimum;
iv. the pool operating scheme is adapted by accounting for the modified map; and
v. the pool is operated by implementing the modified operating scheme.

According to the invention, a correlation coefficient equal to 1 can be chosen in the meshes of the meshing where there is no desire to modify the map, and a correlation coefficient other than 1 is chosen in the meshes of the meshing where there is a desire to modify the map.

According to one embodiment, after the step iii), a set of random numbers which are used to generate the first map is modified, then the method is reiterated at step ii).

According to another embodiment, the representation comprises N maps, N being an integer strictly greater than 1, N−1 correlation coefficients between the first random function are chosen and N−1 other random functions of the same mean and the same covariance are chosen, and the maps are modified by performing a cosimulation of the first random function and of the N−1 other random functions by using the correlation coefficients.

Other features and advantages of the method according to the invention will become apparent from reading the following description of nonlimiting exemplary embodiments, with reference to the appended figures and described hereinbelow.

DETAILED DESCRIPTION OF THE INVENTION

Figure 1:
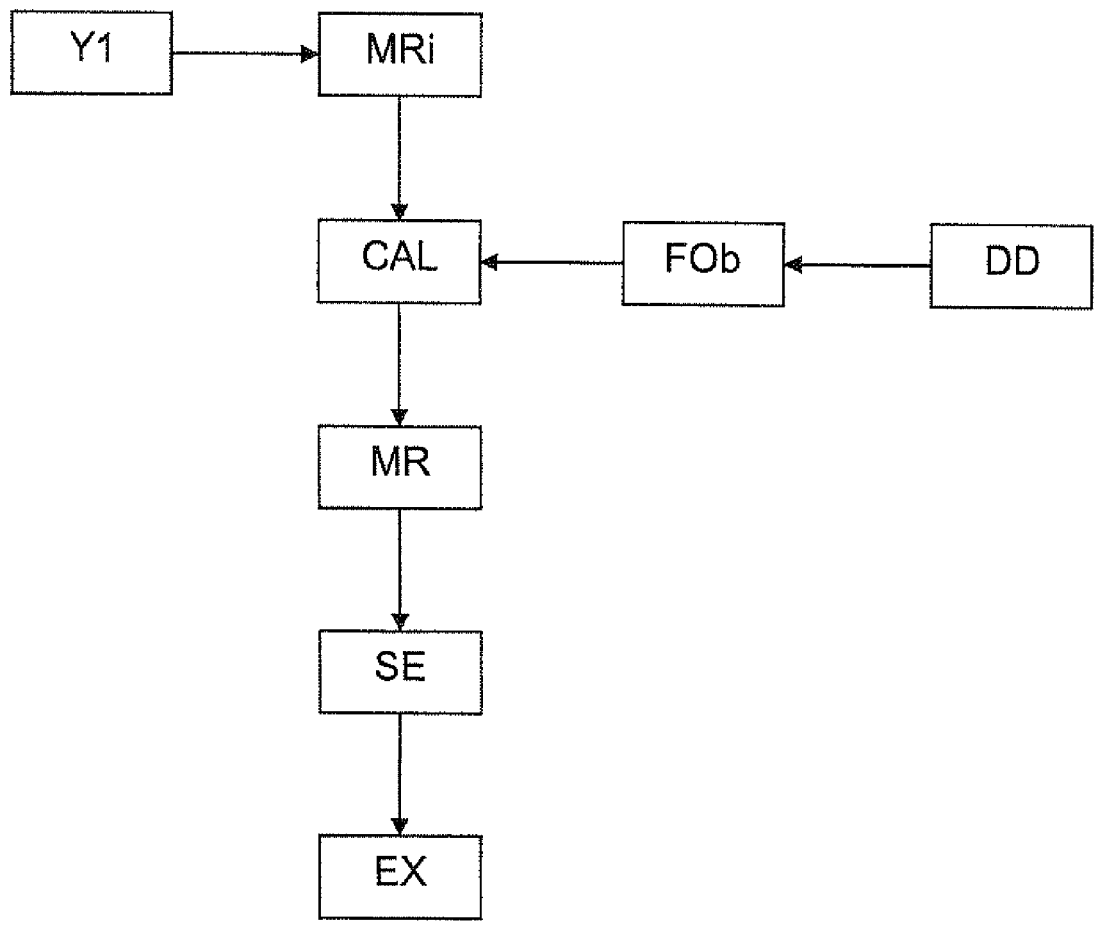
FIG. 1 illustrates the method for operating an oil pool according to the invention.
Figure 4:
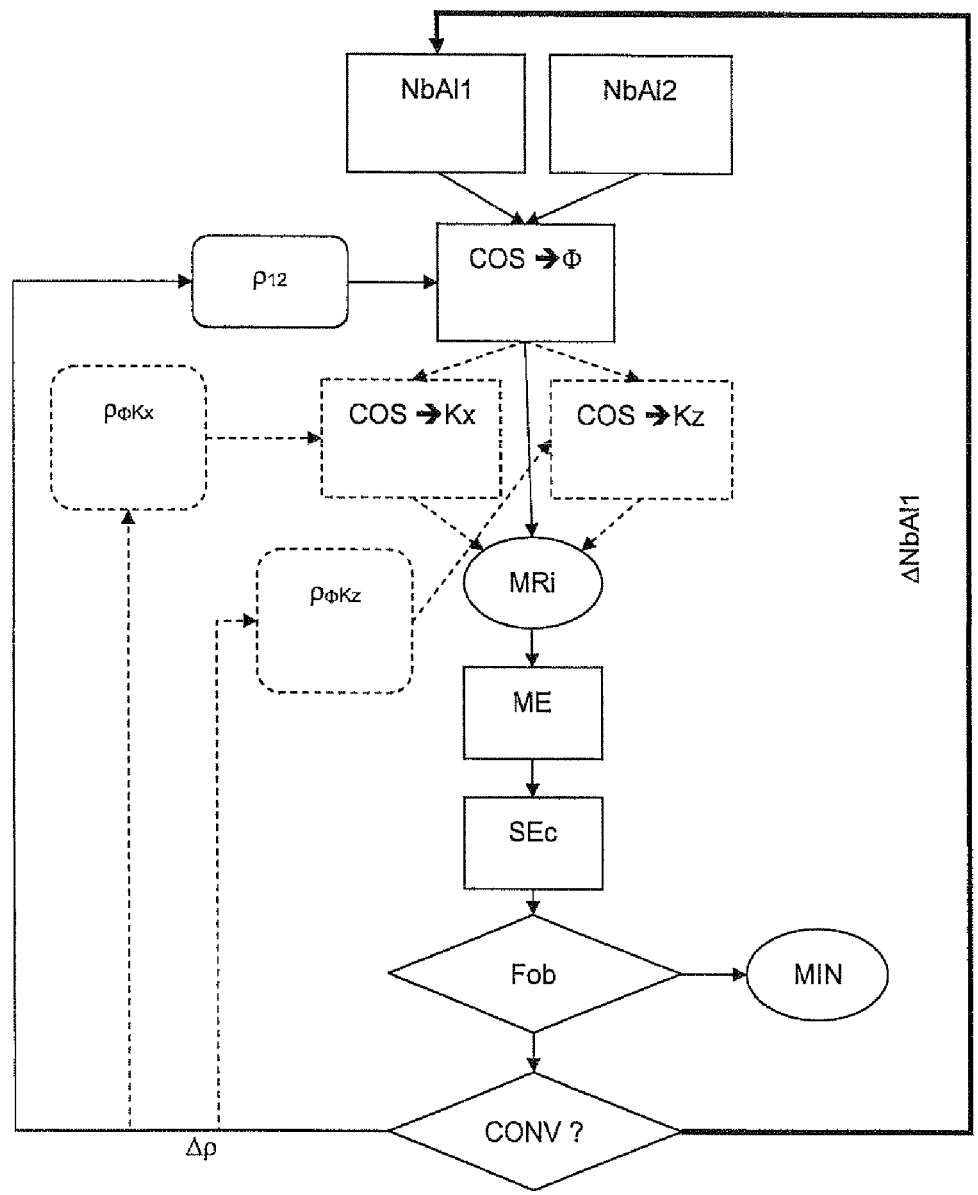
FIG. 4 illustrates the history matching step according to the cosimulation perturbation method.

FIG. 1 illustrates the method for operating an oil pool according to the invention. FIG. 4 illustrates the history matching step. The method mainly comprises four steps:

1. an initial reservoir model (MRi) is generated from a first random function (Y1);
2. dynamic data (DD) are acquired during operation of the pool, and an objective function (FOb) is defined for the history matching;
3. a history matching (CAL) is performed (FIG. 4) by carrying out the following steps:
    i. a correlation coefficient (ρ12) between the first random function (Y1) and a second random function (Y2) is chosen;
    ii. the reservoir model (MR) is modified by performing a cosimulation of the first random function (Y1) and of the second random function (Y2) by using the correlation coefficient (ρ12);
    iii. the correlation coefficient is modified and the step ii) is reiterated until the objective function converges toward a minimum (MIN);

4. the pool is operated (EX) according to an operating scheme (SE) adapted to the reservoir model.

1—Generation of an Initial Reservoir Model (MRi)

The geological formations are usually highly heterogeneous environments. The modeling of a reservoir, that is to say, the construction of a reservoir model representative of the reservoir, entails using construction methods which are called "probabilistic" because of the limited information available (small number of wells, etc.). Because of this, the geological models constructed from these probabilistic methods are called "stochastic models". The construction of a stochastic reservoir model must first of all depend on the environment of the geological deposit, which makes it possible to represent the major heterogeneities affecting the flow of fluids. The incorporation of the static data in this model involves linear operations and can be done using geostatistical techniques well known to the experts.

A reservoir model, represented on a computer, includes a grid with N dimensions (N>0 and usually equal to two or three) in which each of the meshes is assigned the value of a property characteristic of the area being studied. This may be, for example, the porosity or the permeability distributed in a reservoir. These values form maps. Thus, a model is a grid associated with at least one map.

The value of a property characteristic of the area being studied is called regionalized variable. This is a continuous variable, distributed in space, and representative of a physical phenomena. From the mathematical point of view, it is simply a function $z(u)$ that takes a value at each point u (the mesh of the grid) of a field of study D (the grid representative of the reservoir). However, the variation of the regionalized variable in this space is too irregular to be able to be formalized by a mathematical equation. In fact, the regionalized variable represented by $z(u)$ has both a global aspect, relative to the spatial structure of the phenomenon being studied, and a random local aspect.

This last aspect, the random local aspect, can be modeled by a random variable (VA). A random variable is a variable that can take a certain number of realizations z according to a certain probability law. Continuous variables such as the seismic attributes (acoustic impedance) or petrophysical properties (saturation, porosity, permeability) can be modeled by VAs. Because of this, at the point u, the regionalized variable $z(u)$ can be considered to be the realization of a random variable Z.

However, in order to correctly represent the spatial variability of the regionalized variable, it is necessary to be able to take into account the dual aspect, both random and structured. One possible approach, of probabilistic type, involves the concept of random function. A random function (FA) is a set of random variables (VA) defined over a field of study D (the grid representative of the reservoir), that is to say $\{Z(u), u*D\}$, also denoted $Z(u)$. Thus, any group of sampled values $\{z(u1), \ldots, z(un)\}$ can be considered to be a particular realization of the random function $Z(u)=\{Z(u1), \ldots, Z(un)\}$. The FA $Z(u)$ makes it possible to take into account both the locally random aspect (at $u^*$, the regionalized variable $z(u^*)$ being a VA) and the structured aspect (via the spatial probability law associated with the FA $Z(u)$).

The realizations of a random function provide stochastic reservoir models. From such models, it is possible to assess how to operate the subterranean area being studied. For example, the simulation of the flows in a porous environment represented by digital stochastic models makes it possible, among other things, to predict the production of the reservoir and thus optimize its operation by testing various scenarios.

The reservoir model constitutes a representation of the pool. It comprises a meshing associated with at least one map of a characteristic property of the pool. This map is obtained by a stochastic simulation of a first random function. This last step can be described as follows:

First, static data (logs, measurements on samples taken from the wells, seismic, etc.), are measured in the field.

Then, from the static data, a random function is defined which is characterized by its covariance function (or, similarly, by its variogram), its variance and its mean.

Moreover, a set of random numbers taken independently of one another is defined. This may concern, for example, a Gaussian white noise or uniform numbers. There is therefore an independent random number for each mesh and for each realization.

Finally, from a chosen geostatistical simulator, and a set of random numbers, a random draw in the random function is performed, giving access to a realization (continuous or discrete) representing a possible image of the reservoir. Conventionally, the random draw is done in a hierarchical framework. Firstly, the reservoir model is populated randomly by a realization of the random function associated with the facies, conditionally on the facies measurements performed on an ad hoc basis. Then, the porosity is generated randomly on each of the facies, conditionally on the porosity data obtained on the facies concerned. Then, the horizontal permeability is simulated according to its associated random function, conditionally on the facies and on the porosities drawn previously, and on the permeability measurements performed in the field. Finally, the reservoir model is populated by a random realization of the vertical permeability conditionally on all the preceding simulations and on the permeability data obtained on an ad hoc basis.

2—Acquisition of Dynamic Data (DD)

At this stage, the dynamic data have not been considered in constructing the reservoir model. Dynamic data are therefore acquired during operation of the pool. These are production, well test, drilling time, 4D seismic, and other such data, the particular feature of which is that they vary over time as a function of the fluid flows in the reservoir.

This step is performed by means of measuring tools such as flow meters or seismic campaigns.

These dynamic data will then be incorporated in the reservoir model through an optimization (history matching). An objective function is therefore defined which measures the deviation between the dynamic data measured in the field and the corresponding responses simulated for the model concerned. The aim of the optimization process is to modify the model little by little to reduce the objective function.

3—History Matching (CAL)

The map (associated with the reservoir model) is modified so as to minimize the objective function measuring the difference between the dynamic data and the dynamic data simulated by the representation of the pool (reservoir model). This step is performed by a computer running technical software called a flow simulator. This software makes it possible to simulate the dynamic data from the representation of the pool.

The method according to the invention uses the cosimulation technique. Cosimulating jointly simulates N realizations of N random functions of means $m_i$, $i=1$, N and covariance functions $C_i$, $i=1$, N, taking into account correlation coefficients $\rho_{i,j}$ between the random functions i and j. These coefficients take values between −1 and 1. The principles of the cosimulation are explained among other things in the following documents:

Goovaerts, P., 1997, Geostatistics for Natural Resources Evaluation, Oxford Press, New York, 483 p.

Anderson, T. W., 1984, An Introduction to Multivariate Statistical Analysis, John Wiley & Sons, New York, 675 p.

The method comprises the following steps:

i. a correlation coefficient (ρ12) between the first random function (Y1) and a second random function (Y2) is chosen;

ii. the reservoir model is modified by performing a cosimulation of the first random function (Y1) and of the second random function (Y2) by using the correlation coefficient (ρ12);

iii. the correlation coefficient is modified and the step ii) is reiterated until the objective function converges toward a minimum (MIN).

Principle of the Cosimulation Perturbation Method

The simulation of two correlated random functions $Y_{i=1,2}$ is considered which are representative, for example, of the porosity, with the same mean m and covariance C. Let $y_1$ be a realization of $Y_1$: this is the initial realization of porosity.

Efforts are then made to simulate another realization of porosity $y_2$ of $Y_2$, knowing $y_1$. The linear correlation coefficient between these two realizations is $\rho_{12}$. In fact, the cross-covariance has the value $C_{12}=\rho_{12}C$. In this case, it can be shown that the mean and the covariance of $Y_2$, knowing $Y_1$, have the values:

$$m_{2|1} = m + \rho_{12}(Y_1 - m) \text{ and } C_{2|1} = (1 - \rho_{12}^2)C$$

Figure 2:
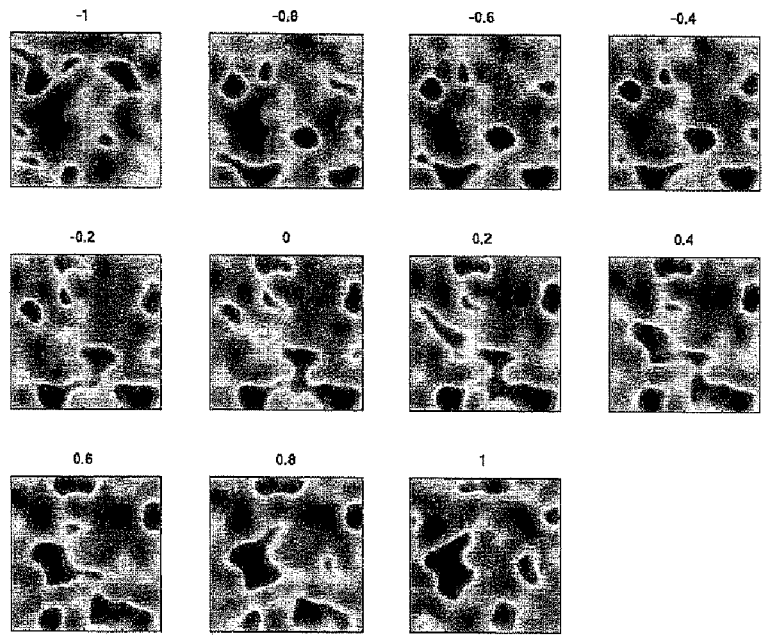
FIG. 2 illustrates an application of the cosimulation perturbation method in the case of a perturbation affecting all the meshes of the geological model.

With the conditional mean and covariance being known, it is possible to use standard stochastic simulation algorithms to generate the realization $y_2$. If the correlation coefficient is continually modified between −1 and 1 while keeping the same terms, a continuous chain of realizations $y_2(\rho_{12})$ is obtained (FIG. 2). FIG. 2 shows realizations of porosity y2 generated from the probability law of Y2 knowing Y1 by increasing the correlation coefficient from −1 to 1. The initial realization of porosity y1 corresponds to a correlation coefficient of 1. When $p\rho_{12}$ has the value 1, $y_2$ is identical to the initial realization $y_1$. When it has the value 0, $y_2$ is independent of $y_1$. When it has the value −1, $y_2$ is the reversed image of $y_1$.

4—Operation of the Pool According to an Adapted Operating Scheme (EX—SE)

From such a reservoir model matched with the dynamic data, the experts define an operating scheme (placement of the production, injection, and other wells).

The pool is then operated according to this operating scheme adapted to the reservoir model obtained from the history matching.

Variants

Local Perturbations

The cosimulation perturbation method according to the invention, can be extended to the case of a local perturbation, by considering the correlation coefficient $\rho_{12}$ as a function rather than as a scalar: it has the value 1 in the meshes of the model which must not be modified and any other value between −1 and 1 in the meshes which must be modified.

Furthermore, to ensure the continuity of the realization of porosity even after a local perturbation, the cosimulation principle is applied to the random numbers used to generate the realizations of porosity rather than to the realizations of porosity themselves. The procedure can now simulate $Z_1$ and then $Z_2$ knowing $Z_1$, with $Z_1$ and $Z_2$ being two random functions of zero mean and of identity covariance function. Let $z_1$ and $z_2$ be two realizations of $Z_1$ and $Z_2$. $z_1$ is the set of random numbers used to generate the initial realization of porosity $y_1$. As previously, the correlation coefficient between $z_1$ and $z_2$ is denoted $\rho_{12}$. The mean and covariance of $Z_2$, knowing $Z_1$, then become:

$$m_{2|1}=\rho_{12}z_1 \text{ and } C_{2|1}=(1-\rho_{12}^2)I$$

With the conditional mean and covariance being known, it is possible to generate $z_2$, $$z_2=\rho_{12}z_1+\sqrt{1-\rho_{12}^2}\,z_1^{(2)} \quad (2)$$

Figure 3:
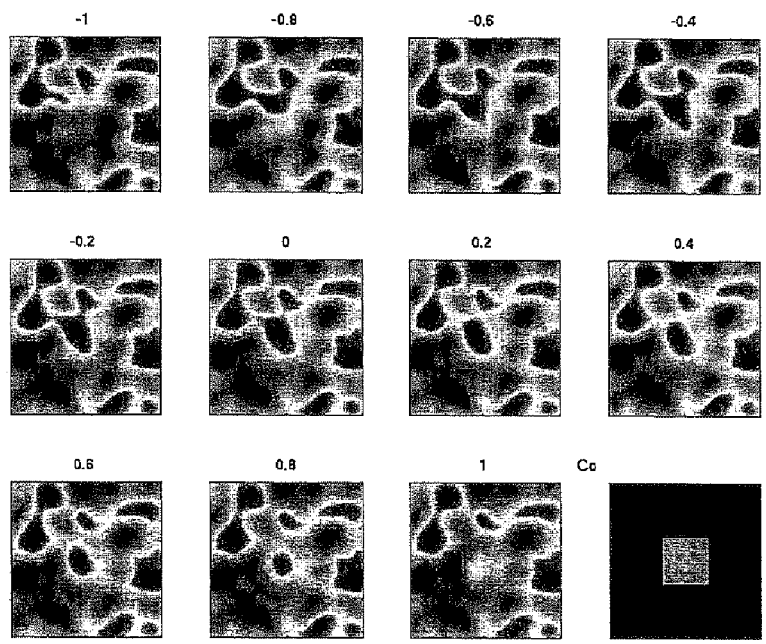
FIG. 3 illustrates an application of the cosimulation perturbation method in the case of a perturbation affecting some of the meshes situated at the center of the geological model.

$z_1^{(2)}$ is a set of random numbers independent of $z_1$. $z_2$ can then be used as set of random numbers to generate the realization of porosity $y_2$. If the correlation coefficient is continuously modified between −1 and 1 in the area in which a modification is desired, while keeping this coefficient equal to 1 in the rest of the model, and the same sets of random numbers are kept, a continuous chain of realizations $y_2(\rho_{12})$ is obtained, as illustrated in FIG. 3. In this figure, the image bottom right represents the value of the correlation coefficient assigned to each mesh: in gray, the coefficient has the value 1, and there is therefore no modification, in black, the coefficient is different from 1 and there is therefore a deformation of the image.

Perturbation of N Realizations

The cosimulation perturbation method can also be extended to the case of the cosimulation of N correlated realizations. Then a return to the formulae explained previously is made. They can be used recursively to calculate $m_{3|2}$ and $C_{3|2}$ and therefore $z_3$ and $y_3$, then $m_{4|3}$ and $C_{4|3}$ and therefore $z_4$ and $y_4$, etc. More generally, it is shown that, at the iteration N, the following apply:

$$m_{N|N-1} = \prod_{i=1}^{N-1} \rho_{i,i+1}z_1 + \sum_{k=2}^{N-1}\left(\sqrt{1-\rho_{k-1,k}^2}\prod_{i=k}^{N-1}\rho_{i,i+1}z_1^{(k)}\right)$$

$$C_{N|N-1} = (1 - \rho_{N-1,N}^2)I$$

$$z_N = \prod_{i=1}^{N-1}\rho_{i,i+1}z_1 + \sum_{k=2}^{N-1}\left(\sqrt{1-\rho_{k-1,k}^2}\prod_{i=k}^{N-1}\rho_{i,i+1}z_1^{(k)}\right) + \sqrt{(1-\rho_{N-1,N}^2)}\,z_1^{(N)}$$

The instances of $\rho_{i,i+1}$ are the correlation coefficients between the realizations of porosity i and i+1. These are all parameters which can be adjusted during the matching process to construct a geological model that confirms the dynamic data.

The cosimulation perturbation method has been introduced in relation to realizations of porosity. It applies in the same way to realizations of permeability or of initial saturation, or of any other characteristic property of the reservoir.

Example of Application

To illustrate the method, a case of application created in the context of the European "Production Forecasting with Uncertainty Quantification" project is described on the basis of a real oil reservoir. This case is often used to assess the new matching methods. The field contains oil and gas. It is produced from 6 producing wells located close to the line of contact between the oil and the gas. The production history comprises: 1 year with well tests, 3 years during which the wells are closed, and 4 years of production. During these 8 years, data on pressure (BHFP), on gas/oil ratio (GOR) by volume and on relative quantity of water produced (W CUT) are collected from the wells. The distribution of the porosities and permeabilities in the reservoir is unknown.

The goal is then to use the cosimulation perturbation method to construct a geological model reproducing these data, that is to say, a 3D grid with porosity and permeability values assigned to each mesh. The organization of the various steps of the method is illustrated by FIG. 4.

Step 1: Initialization

Two sets of random numbers (NbA|1, NbA|2) are generated. A correlation coefficient ($\rho_{12}$) for the porosity initially with the value 1 is considered. Furthermore, a correlation coefficient ($\rho_{\Phi Kx}$) is determined between the porosity and the horizontal permeability as is another ($\rho_{\Phi Kz}$) between the porosity and the vertical permeability from the available porosity and permeability measurements. For example, reference is made to measurements performed in the laboratory on rock samples taken from the wells.

Step 2: Construction of an Initial Reservoir Model

The first step is to generate an initial reservoir model (MRi), which takes into account different aspects such as the geological structure, the petrophysical properties, the fluid properties, the wells, and so on. This model is a 3D grid. Since the porosities and permeabilities are unknown, realizations of porosity are generated randomly first of all followed by realizations of horizontal and vertical permeability to populate the meshes. The realizations of permeability and of porosity are correlated: this correlation is reflected in a correlation coefficient.

A first realization of porosity is generated first from the first set of random numbers. Then, a realization of porosity is cosimulated (COS) on the basis of the second set of random numbers knowing the initial porosity. The initial realization of porosity ($\Phi$) is obtained when the correlation coefficient has the value 1. The other two correlation coefficients are then considered. A realization for the horizontal permeability (Kx) and another for the vertical permeability (Kz) are then cosimulated (COS) knowing the porosity. By varying the correlation coefficients, new values are obtained for the porosities and permeabilities. Since the aim is to determine the latter, the correlation coefficients will be treated hereinafter as adjustment parameters.

Figure 5:
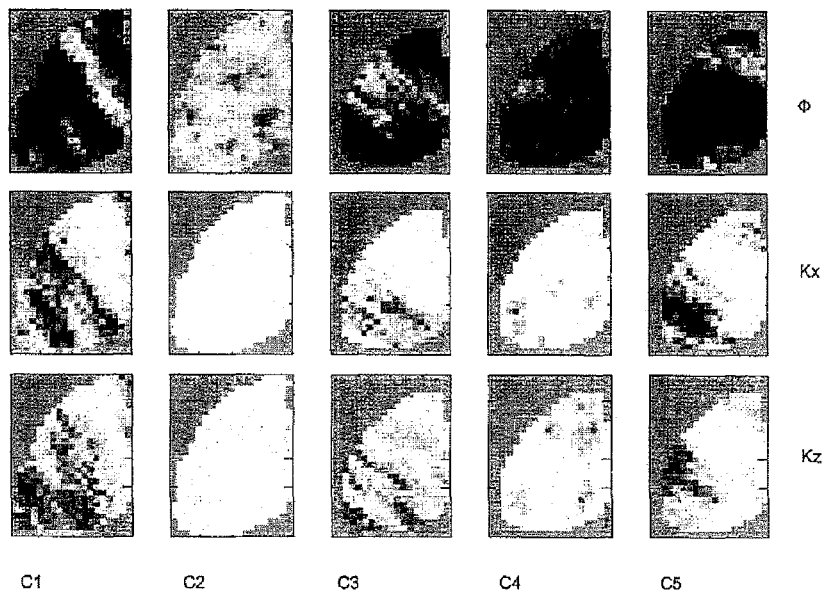
FIG. 5 represents the realizations of porosity ($\Phi$), of horizontal permeability (Kx) and vertical permeability (Kz) generated to populate the five layers (C1 to C5) of the initial reservoir model.

The initial reservoir model constitutes the starting point of the matching process: FIG. 5 represents the realizations of porosity ($\Phi$), of horizontal permeability (Kx) and of vertical permeability (Kz) generated to populate the five layers (C1 to C5) of the initial reservoir model.

Step 3: Scaling (ME)

When the reservoir model has too great a number of meshes, it is scaled. A more rough reservoir with a smaller number of meshes is deduced therefrom. This step makes it possible to reduce the calculation times required by the following step.

Step 4: Flow Simulation (SEc)

Simulation is used to reproduce the production scheme of the oil reservoir. The response in production associated with the reservoir model concerned is thus obtained.

Step 5: Comparison of the Simulated Responses and of the Production Data (FOb)

The digital response from the flow simulator is compared to the actual production data (in the example considered, these are pressures, gas/oil product volume ratios and relative quantity of water produced) measured in the field. The deviation between the data and the results of the simulation is measured by a function, called objective function. If this function is very small (MIN), the reservoir model is considered to be reliable and retained for planning the future management of the field. Otherwise, the porosity and permeability values assigned to the meshes of the model must be modified. In other words, the values of the correlation coefficients must be modified ($\Delta \rho$) until the objective function is sufficiently small. In the example considered, the reservoir model comprises 5 layers that are mutually independent. For each of them, the porosities and permeabilities are perturbed on the basis of 3 correlation coefficients. The matching of the production data is therefore done by adjusting 15 parameters. At this stage, the 15 correlation coefficients are modified and there is a return to the step 2.

Step 6: Repetition of the Matching Process

The cosimulation process for the porosity depends on 2 sets of random numbers. De facto, by modifying the correlation coefficient attached to the realization of porosity, the process is restricted to a very small portion of the survey space. It is then therefore possible not to have the correct conditions to identify a reservoir model that minimizes the deviation between the actual production data and the corresponding digital responses. To overcome this difficulty, the possibility of exploring other parts of the survey space is exploited: when the step 5 does not provide for any convergence (CONV) toward a minimum value of the objective function, the correlation coefficients determined at this stage are used to update ($\Delta$NbA|1) the first set of random numbers. Another is also generated therefrom by chance. Then, there is a return to the step 2. This step stops being repeated when the objective function is low enough or when the number of iterations performed exceeds a maximum number authorized by the user.

Figure 6:
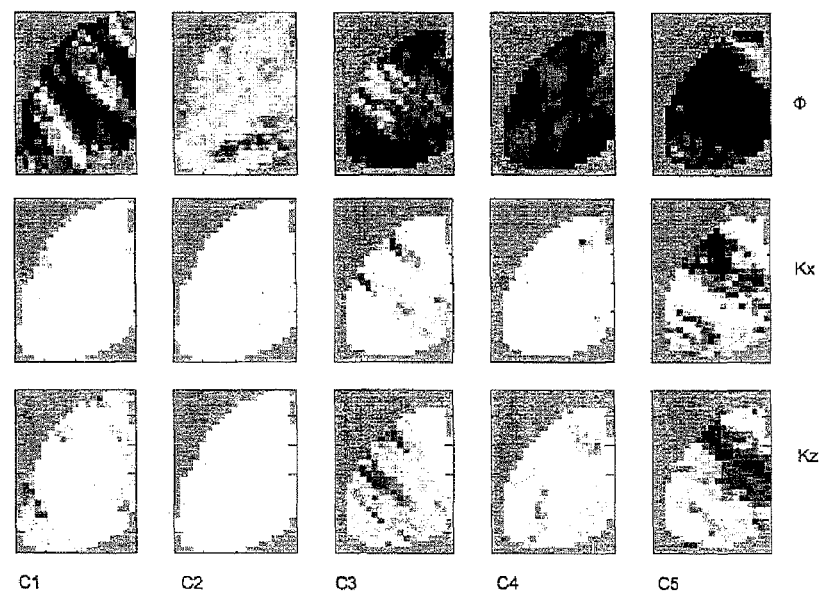
FIG. 6 represents the realizations of porosity (at the top), of horizontal permeability (in the middle) and vertical permeability (at the bottom) generated to populate the five layers of the reservoir model obtained after matching.
Figure 7:
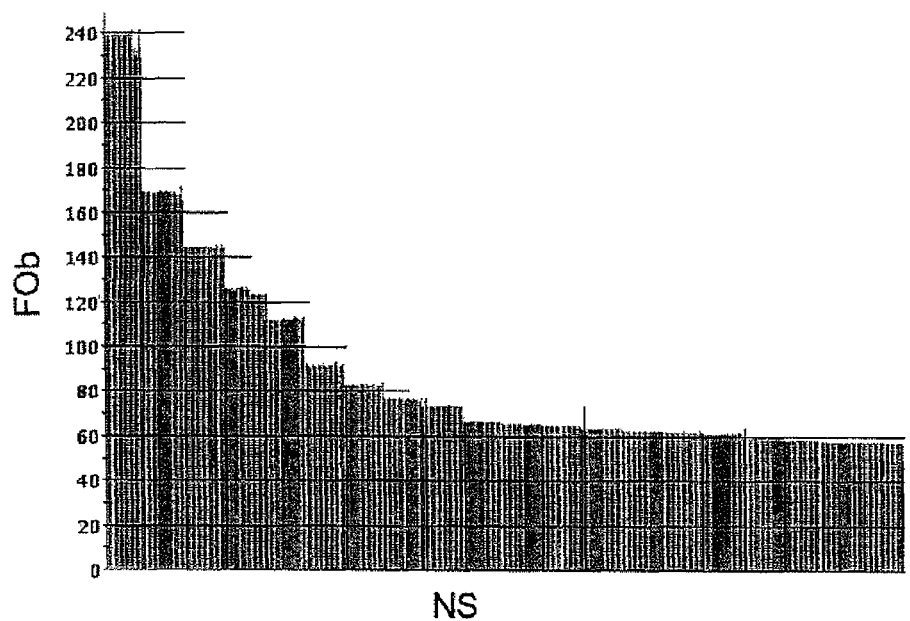
FIG. 7 illustrates the trend of the objective function (which measures the deviation between the real production data and the corresponding digital responses) as a function of the number of iterations.

The reservoir model determined at the end of the matching process is illustrated in FIG. 6. The responses in production obtained for this model can be used to check that the deviation between the actual data and the simulated data has greatly diminished. The trend of the objective function (FOb) is represented in FIG. 7 as a function of the number of flow simulations (NS) carried out: it changes from 238 to 56.

The invention claimed is:

1. A method for operating an oil pool according to an operating scheme based on a representation of the pool including obtaining a meshing associated with at least one map of a property of the pool by a stochastic simulation of a first random function, in which dynamic data are acquired during operation of the pool and the at least one map is modified to minimize an objective function measuring a difference between the dynamic data which are simulated by the representation of the pool and a flow simulator comprising:

i. choosing at least one correlation coefficient between the first random function and at least one second random function with an identical mean and covariance;

ii. modifying the at least one map by performing a cosimulation of the first random function and the at least one second random function by using the at least one correlation coefficient;

iii. modifying the at least one correlation coefficient and reiterating the cosimulation with the at least one modified correlation coefficient in order to produce a random function with an identical mean and covariance as the first random function until the objective function converges toward a minimum;

iv. changing the pool operating scheme by accounting for the modified map; and v. operating the pool implementing the modified operating scheme.

2. A method according to claim 1, comprising:

choosing a correlation coefficient equal to 1 for meshes of the meshing when the at least one map is not to be modified; and choosing a correlation coefficient other than 1 for the meshes of the meshing when the map is to be modified.

3. A method according to claim 1, wherein after step iii), modifying a set of random numbers used to generate the at least one map and reiterating step ii).

4. A method according to claim 2, wherein after step iii), modifying a set of random numbers used to generate the at least one map and reiterating step ii).

5. A method according to claim 1, wherein the representation comprises N maps with N being an integer greater than 1 and choosing N−1 correlation coefficients between the first random function and N−1 other random functions having an identical mean and identical covariance and modifying the N maps by performing a cosimulation of the first random function and of the N−1 other random functions by using the N−1 correlation coefficients.

6. A method according to claim 2, wherein the representation comprises N maps with N being an integer greater than 1 and choosing N−1 correlation coefficients between the first random function and N−1 other random functions having an identical mean and identical covariance and modifying the N maps by performing a cosimulation of the first random function and of the N−1 other random functions by using the N−1 correlation coefficients.

7. A method according to claim 3, wherein the representation comprises N maps with N being an integer greater than 1 and choosing N−1 correlation coefficients between the first random function and N−1 other random functions having an identical mean and identical covariance and modifying the N maps by performing a cosimulation of the first random function and of the N−1 other random functions by using the N−1 correlation coefficients.

8. A method according to claim 4, wherein the representation comprises N maps with N being an integer greater than 1 and choosing N−1 correlation coefficients between the first random function and N−1 other random functions having an identical mean and identical covariance and modifying the N maps by performing a cosimulation of the first random function and of the N−1 other random functions by using the N−1 correlation coefficients.

* * * * *